(12) United States Patent
Imai (10) Patent No.: US 7,228,530 B2
(45) Date of Patent: Jun. 5, 2007

(54) SOURCE PROGRAM PROCESSING METHOD

(75) Inventor: Takeo Imai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 814 days.

(21) Appl. No.: 10/356,540

(22) Filed: Feb. 3, 2003

(65) Prior Publication Data

US 2003/0149968 A1 Aug. 7, 2003

(30) Foreign Application Priority Data

Feb. 4, 2002 (JP) ............................. 2002-027172

(51) Int. Cl.
G06F 9/45 (2006.01)
(52) U.S. Cl. ...................... 717/144; 717/142; 717/143; 717/155; 717/156; 717/159
(58) Field of Classification Search ......... 717/124–159
See application file for complete search history.

(56) References Cited

U.S. PATENT DOCUMENTS

| | | | | |
|---|---|---|---|---|
| 5,058,144 | A * | 10/1991 | Fiala et al. ................. | 375/240 |
| 5,699,507 | A | 12/1997 | Goodnow, II et al. | |
| 6,807,546 | B2 * | 10/2004 | Young-Lai .................. | 707/102 |
| 6,859,455 | B1 * | 2/2005 | Yazdani et al. ............. | 370/392 |

FOREIGN PATENT DOCUMENTS

JP 2001-125783 5/2001

OTHER PUBLICATIONS

W.J. Krzanowski, et al., "The Dendrogram", Kendall's Library of Statistics 2, Maltivariate Analysis Part 2, 1995, Chapter 10, Section 4, pp. 65-67.
Jean Mayrand, et al., "Experiment on the Automatic Detection of Function Clones in a Software System Using Metrics", IEEE, 1063-6773/96, 1996, pp. 244-253.
Jean Mayrand, et al., "Evaluating the Benefits of Clone Detection in the Software Maintenance Activities in Large Scale Systems", 1996, 3 Pages.
Magdalena Balazinska, et al., "Measuring Clone Based Reengineering Opportunities", 1999, pp. 1-12.

* cited by examiner

*Primary Examiner*—Chuck Kendall
(74) *Attorney, Agent, or Firm*—Oblon, Spivak, McClelland, Maier & Neustadt, P.C.

(57) ABSTRACT

Comparison indices each for two components incorporated in a source program are used for easy and quantitative evaluation of functional redundancy in the program, effective and accurate extraction of redundant code segments from the program and also effective and accurate extraction of components to be modified simultaneously. A tree T is entered and an initial level of functional redundancy m(P) is set at 0 in a program P expressed by the tree T. The top node of the tree T is selected as a node N. A specific computation is performed for the top node selected as the node N with attribute information including the similarity and the number of children of the node N to obtain a level $\alpha$. The level $\alpha$ is added to the functional redundancy m(P). The specific computation is performed for every node in the tree T, to obtain functional redundancy m(P) including the total of $\alpha$ for all nodes.

9 Claims, 9 Drawing Sheets

```
class Class1 {
    public int func1 ( ) {...}
    public void func2 ( ) {...}
} class Class2 {
    public int func3 ( ) {...}
    public void func4 ( ) {...}
}
```

FIG. 9

```
class CommonClass {
    public int func1_3 ( ) {...}
    public void func2_4 ( ) {...}
} class Class1 extends CommonClass {
    public void func2_4 ( ) {...}
} class Class2 extends CommonClass {
    public void func2_4 ( ) {...}
}
```

FIG. 10

SOURCE PROGRAM PROCESSING METHOD

CROSS REFERENCE TO RELATED APPLICATION

This application is based upon and claims the benefit of priority from the prior Japanese Patent Application No. 2002-27172 filed on Feb. 4, 2002 in Japan, the entire contents of which are incorporated by reference.

BACKGROUND OF THE INVENTION

The present invention relates to a source-program processing method for quantitatively evaluating functional redundancy that indicates how many code segments having similar functions have been incorporated in a source program and extracting redundant code segments from the source program.

Code segments having similar functionalities may be included in a design phase in software development.

Programmers could copy pre-incorporated code segments due to unawareness of similar functionalities distributed over the program or for cost saving even if they are aware of the distributed similar functionalities. This could result in many code segments of similar functionalities distributed over one program.

Modifications to the functionalities of some of the distributed similar (functionally-redundant) code segments may require alterations to all of the redundant code segments.

A large number of redundant code segments to be modified at the same time cause cost up for searching a program for the segments to be modified and high possibility of failures in searching. Search-failed code segments could cause malfunctions of the program, which force the programmers into further modifications to clear the malfunctions, thus resulting in further cost up.

Redundant code segments incorporated in software have big effect on the cost of software maintenance such as modifications. Bigger effect will be given to the maintenance cost as the set of redundant code segments becomes larger.

Several techniques to search programs for redundant code segments are known. One is disclosed in Japanese Patent Laid-Open Publication No. 8-241193 in which comparison indices (similarities) are used for evaluating how programs or two code segments are similar to each another. Another one is disclosed in Japanese Patent Laid-Open Publication No. 2001-125783 in which code segments are determined as functionally-redundant code segments when their similarities exceed a reference level.

The known techniques can search for redundant code segments in a program. Nevertheless, these techniques cannot offer quantitative evaluation to the redundant code segments. This leads to ineffective extraction of code segments to be modified from a program, which will be discussed below in detail.

The known technique using similarities in searching for redundant code segments cannot quantitatively evaluate functional redundancy when there are a large number of functionally-redundant code segments. Therefore, this technique cannot offer quantitative evaluation of maintenance cost which could be high due to the existence of the redundant code segments.

The other known technique using a reference level could fail in searching for functionally-redundant code segments. This is because search results largely depend on how the reference level has been set. Another cause is that redundant code segments will be neglected if their similarities are lower than the reference level even though they have similar functionalities.

Another known technique disclosed in Japanese Patent Laid-Open Publication No. 2000-92841, etc., is a statistical technique called hierarchical cluster analysis (HCA) in which components are classified into several groups according to their similarities.

The HCA technique is widely used in several fields, such as:

an analysis of questionnaires disclosed in Japanese Patent Laid-Open Publication No. 2001-184405, etc;

an analysis of status data from targets to be monitored, disclosed in Japanese Patent Laid-Open Publication No. 09-093665, etc; and a classification of a large number of electronic documents linked over a network, disclosed in Japanese Patent Laid-Open Publication No. 10-027125, etc.

The HCA technique is to hierarchically classify a large number of data into several groups to know the feature of each group. It has, however, not been used to evaluate the tendency of all groups with an index derived from the results of classification and determining the groups from which the index has been derived.

Generalization technique is performed to create a new (common) class of the same (or similar) functionality when several classes share the same functionality, in software design with particular object-oriented languages.

The generalization technique has advantages such as (1) low cost for modifications to the same functionality by making modifications only to the common class and (2) easy enhancement by making new derived classes of the same functionality. Original classes are defined as being derived from a common class. Hence, some class definitions have a hierarchical structure.

The generalization technique discussed above is performed to create a common class when several classes share the same or similar functionality and define original classes as derived classes for programs developed with object-oriented languages.

Other similar functionalities that have not been found during design are, however, sometimes found after installation of programs of object-oriented languages. This requires further generalization technique to the newly found similar functionalities, which results in increase in operations after installation.

SUMMARY OF THE INVENTION

In order to overcome the problems discussed above, a purpose of embodiments according to the present invention is to provide a source-program processing method for easy and quantitative evaluation of functional redundancy in a source program.

Several terms used in the following disclosure are defined as follows:

Component . . . sequential instructions over several lines in a program, which will be the unit of processing to a source program, such as, functions and procedures in a program written in C language or class definitions in object-oriented languages.

Comparison index . . . a level indicating the similarity between components. Height of each node in dendrogram with no similarities in the known cluster analysis can be used as the comparison index when this known analysis method is employed in the present invention.

According to a first aspect of the present invention, there is provided a source-program processing method for processing a source program on a computer, the method including: dividing code of the source program into components and extracting a group of components; comparing every two components among the extracted group of components, thus obtaining a comparison index for the two components; classifying the extracted group of components in a tree-like hierarchical structure, based on the extracted group of components and the comparison index for every two components, the hierarchical structure having nodes each possessing three types of information which are the comparison index for every two components, the number of children of each node and the number of leaves of each node; retrieving two types of information, which are the comparison indices and at least one of the number of children of each node and the number of leaves of each node, on each node in the tree-like hierarchical structure and carrying out a specific computation based on the information; and quantitatively evaluating functional redundancy of the source program based on the total result of the specific computation for the nodes in the tree-like hierarchical structure.

Further, according to a second aspect of the present invention, there is provided a method for extracting redundant code segments in a source program on a computer, the method including: going down a tree-like hierarchical structure representative of a group of components of the source-program along the nodes from a top node to leaves of the structure while selecting a node as a child having the maximum number of leaves in each stage of hierarchy by referring to a predetermined reference level for the number of sets of components; and outputting a set of components corresponding to leaves of a newly selected node when the number of leaves of the newly selected node is lower than the reference level or there is no node to be selected as the child.

Moreover, according to a third aspect of the present invention, there is provided a class-hierarchy reorganization method for reorganizing class hierarchy in a source program written in an object-oriented language on a computer, the method including: extracting a group of class definitions having functionally-redundant code segments as a candidate for reorganization from the source program based on class group information on class definitions and comparison indices for class definitions in the source program, when a user indicates necessity for reorganizing class hierarchy, the extracting the group of class definitions including: comparing every two classes from the group of class definitions, thus obtaining a comparison index for the two classes; classifying the group of class definitions in a tree-like hierarchical structure, based on the group of class definitions and the comparison index for every two classes, the hierarchical structure having nodes each possessing three types of information which are the comparison index for every two classes, the number of children of each node and the number of leaves of each node; going down the tree-like hierarchical structure along the nodes from a top node to leaves of the structure while selecting a node as a child having the maximum number of leaves in each stage of hierarchy by referring to a predetermined reference level; and outputting the group of class definitions corresponding to leaves of a newly selected node as a candidate for class-definition reorganization when the number of leaves of the newly selected node is lower than the reference level or there is no node to be selected as the child.

Further, according to a fourth aspect of the present invention, there is provided a computer readable medium containing a program for processing a source program on a computer, the program including instructions for: dividing code of the source program into components and extracting a group of components; comparing every two components among the extracted group of components, thus obtaining a comparison index for the two components; classifying the extracted group of components in a tree-like hierarchical structure, based on the extracted group of components and the comparison index for every two components, the hierarchical structure having nodes each possessing three types of information which are the comparison index for every two components, the number of children of each node and the number of leaves of each node; retrieving two types of information, which are the comparison indices and at least one of the number of children of each node and the number of leaves of each node, on each node in the tree-like hierarchical structure and carrying out a specific computation based on the information; and quantitatively evaluating functional redundancy of the source program based on the total result of the specific computation for the nodes in the tree-like hierarchical structure.

Further, according to a fifth aspect of the present invention, there is provided a computer readable medium containing a program for extracting redundant code segments in a source-program on a computer, the program including instructions for: going down a tree-like hierarchical structure representative of a group of components of the source-program along the nodes from a top node to leaves of the structure while selecting a node as a child having the maximum number of leaves in each stage of hierarchy by referring to a predetermined reference level for the number of sets of components; and outputting a set of components corresponding to leaves of a newly selected node when the number of leaves of the newly selected node is lower than the reference level or there is no node to be selected as the child.

Further, according to a sixth aspect of the present invention, there is provided a computer readable medium containing a program for reorganizing class hierarchy in a source program written in an object-oriented language on a computer, the program including instructions for extracting a group of class definitions having functionally-redundant code segments as a candidate for reorganization from the source program based on class group information on class definitions and comparison indices for class definitions in the source program, when a user indicates necessity for reorganizing class hierarchy, the extracting the group of class definitions including: comparing every two classes from the group of class definitions, thus obtaining a comparison index for the two classes; classifying the group of class definitions in a tree-like hierarchical structure, based on the group of class definitions and the comparison index for every two classes, the hierarchical structure having nodes each possessing three types of information which are the comparison index for every two classes, the number of children of each node and the number of leaves of each node; going down the tree-like hierarchical structure along the nodes from a top node to leaves of the structure while selecting a node as a child having the maximum number of leaves in each stage of hierarchy by referring to a predetermined reference level; and outputting the group of class definitions corresponding to leaves of a newly selected node as a candidate for class-definition reorganization when the number of leaves of the newly selected node is lower than the reference level or there is no node to be selected as the child.

DESCRIPTION OF EMBODIMENT

Embodiments according to the present invention will be disclosed in detail with reference to the attached drawings. Each embodiment disclosed below is just one of the applications of the present invention, and hence not limits the scope of the present invention.

Embodiments according to the present invention are typically realized as software running on a computer. The software in each embodiment runs on a computer to control the hardware to fulfill the purpose of the embodiment and offer several advantages. Embodiments according to the present invention may employ any proper known techniques. Moreover, types and structures of hardware and/or software that realize the present invention and also ranges of targets to be processed by the software under the invention are freely modified. A program that realizes this invention is just one of the embodiments according to the present invention.

Components disclosed in the present specification are, for example, functions and procedures in a program or class definitions in object-oriented languages as mentioned above. Disclosed below are functions in C language as the components.

1. Component Classification

Figure 1:
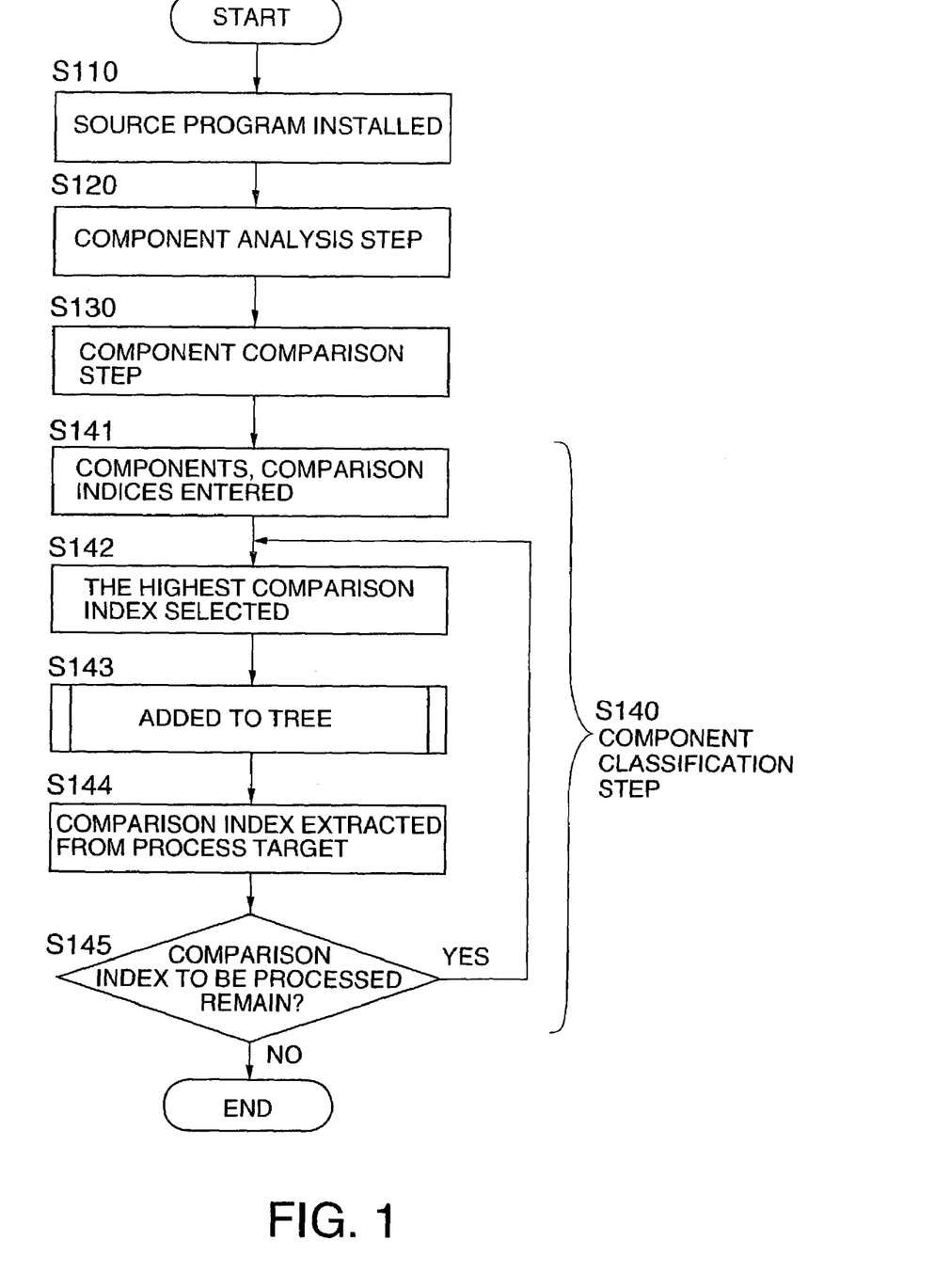
FIG. 1 shows a flowchart indicating an outline of a method of component classification according to a first embodiment of the present invention.
Figure 2:
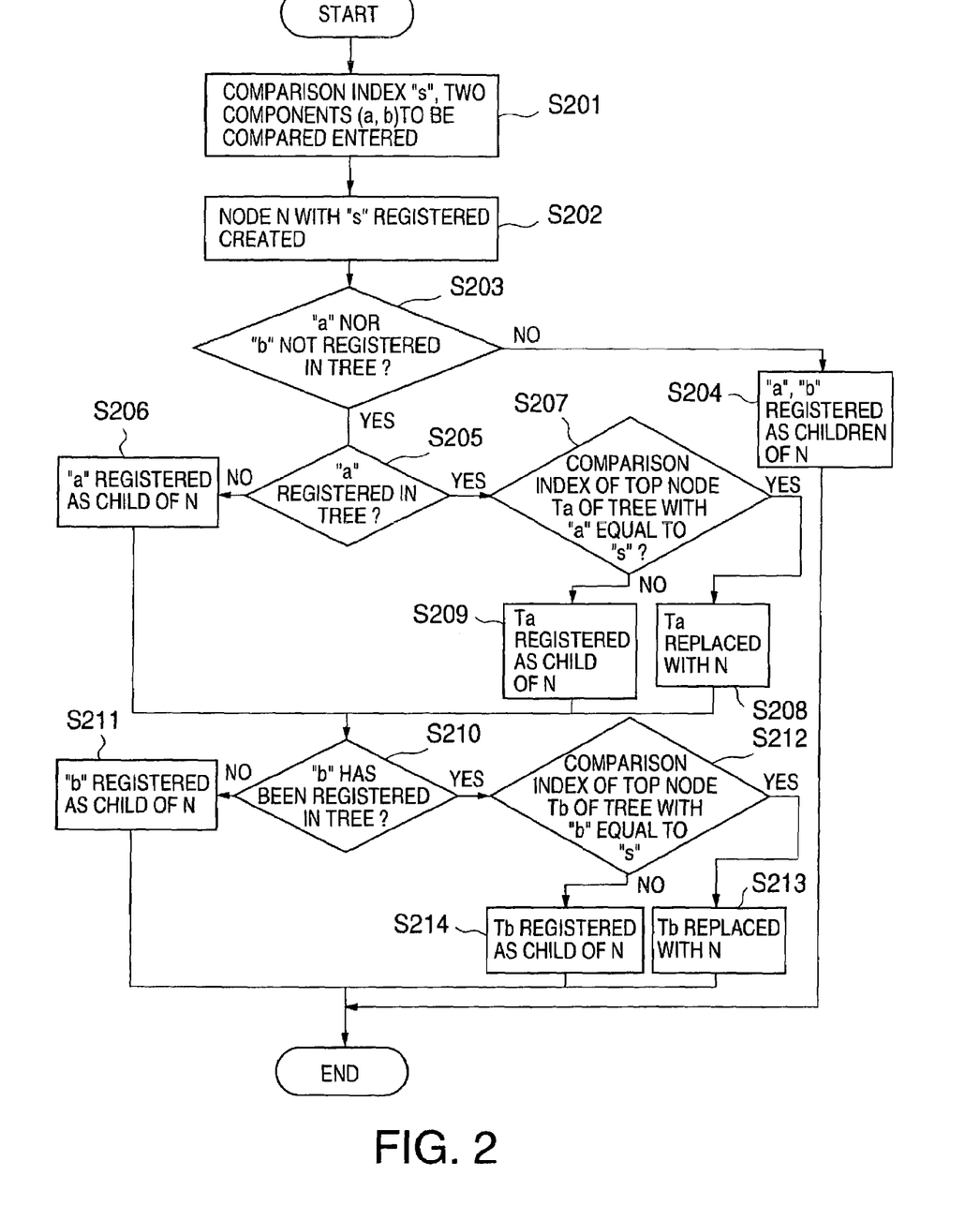
FIG. 2 shows a subroutine for additional proceeding to a tree created through the embodiment in FIG. 1.

FIG. 1 shows a flowchart indicating an outline of a method of component classification according to a first embodiment of the present invention. FIG. 2 shows a subroutine for additional procedure to a tree created through the method in FIG. 1.

As shown in FIG. 1, a source program is installed in a computer and stored in a storage medium such as a memory (S110). All functions involved in the program are extracted in a component analysis step (S120).

The similarity between every two functions is measured in a component comparison step (S130). The similarity is determined only for two functions. It is a comparison index for evaluation of how two functions are similar to each another.

The similarity is discussed further in detail. The set of any number of similarities is the totally order set. In detail, for example, there are a combination A of two functions a1 and a2, and another combination B of two functions b1 and b2, or A=(a1, a2) and B=(b1, b2).

Suppose that the functions a1 and a2 are more similar to each other than the functions b1 and b2 are, or a1 and a2 are as similar as b1 and b2 are. This is an order relation in which the rank of a similarity s(A) in the combination A is higher than or equal to the rank of a similarity s(B) in the combination B. Especially when the order relation is established and the rank of the similarity s(A) is not equal to the rank of the similarity s(B), a relation "s(A) is higher than s(B)" is established.

It is then defined that the functions a1 and a2 of the combination A has higher similarity than the functions b1 and b2 of the combination B. Or, it is defined that the functions b1 and b2 of the combination B has lower similarity than the functions a1 and a2 of the combination A.

The similarity is, for example, a ratio of lines of the same characters to the total lines of two functions in a program, thus expressed as a real number.

In FIG. 1, the process goes to a component classification step (S140) to create a hierarchical tree structure (called a tree hereinafter) having several nodes. The tree is created by using the functions extracted in the component analysis step (S120) and the similarity between every two functions measured in the component comparison step (S130).

In the component classification step, the functions (the components) and the similarities (the comparison indices), are entered (S141). Then, a combination of functions having the highest similarity is selected (S142). The selected function combination is added to the tree and its similarity is registered as a node (S143).

Two or more combinations of functions may be selected with registration of their similarities when several combinations have the highest similarity.

The tree addition process is indicated in FIG. 2.

In detail, a similarity "s", a comparison index, and two components (a, b) to be compared are entered (S201) and create a node N having the similarity "s" registered therein.

It is determined whether the component "a" or "b" has been registered in the tree. Both components "a" and "b" are registered as children of the node N if neither has been registered (S204). Then, the addition process ends.

If either has been registered, it is determined whether the component "a" has been registered in the tree (S205). If not, the component "a" is registered as a child of the node N (S206).

On the other hand, if the component "a" has been registered, it is determined whether a comparison index of a top node Ta of the tree involving the component "a" is equal to the similarity "s" (S207). If equal, the top node Ta is replaced with the node N (S208). If not equal, however, the top node Ta is registered as a child of the node N, and the process goes to step S210.

Replacing a node P with a node Q is a process to register all children of the node P as those of the node Q and then delete the node P.

Next, it is determined whether the component "b" has been registered in the tree (S210). If not, the component "b" is registered as a child of the node N (S211).

On the contrary, if the component "b" has been registered, it is determined whether a comparison index of a top node Tb, of the tree involving the component "b", is equal to the similarity "s" (S212). If equal, the top node Tb is replaced with the node N (S213). If not equal, the top node Tb is registered as a child of the node N (S214). Then, the tree addition process ends.

On completion of the addition process, the similarity of the registered function combination is extracted from the component classification process (S144). Two or more of similarities may be extracted if there are.

It is then determined whether there are similarities to be subjected to the process (S145). If there are (YES in S145), the process returns to S142 to select the function combination having the next highest similarity. If not (NO in S145), the component classification process ends.

Figure 3:
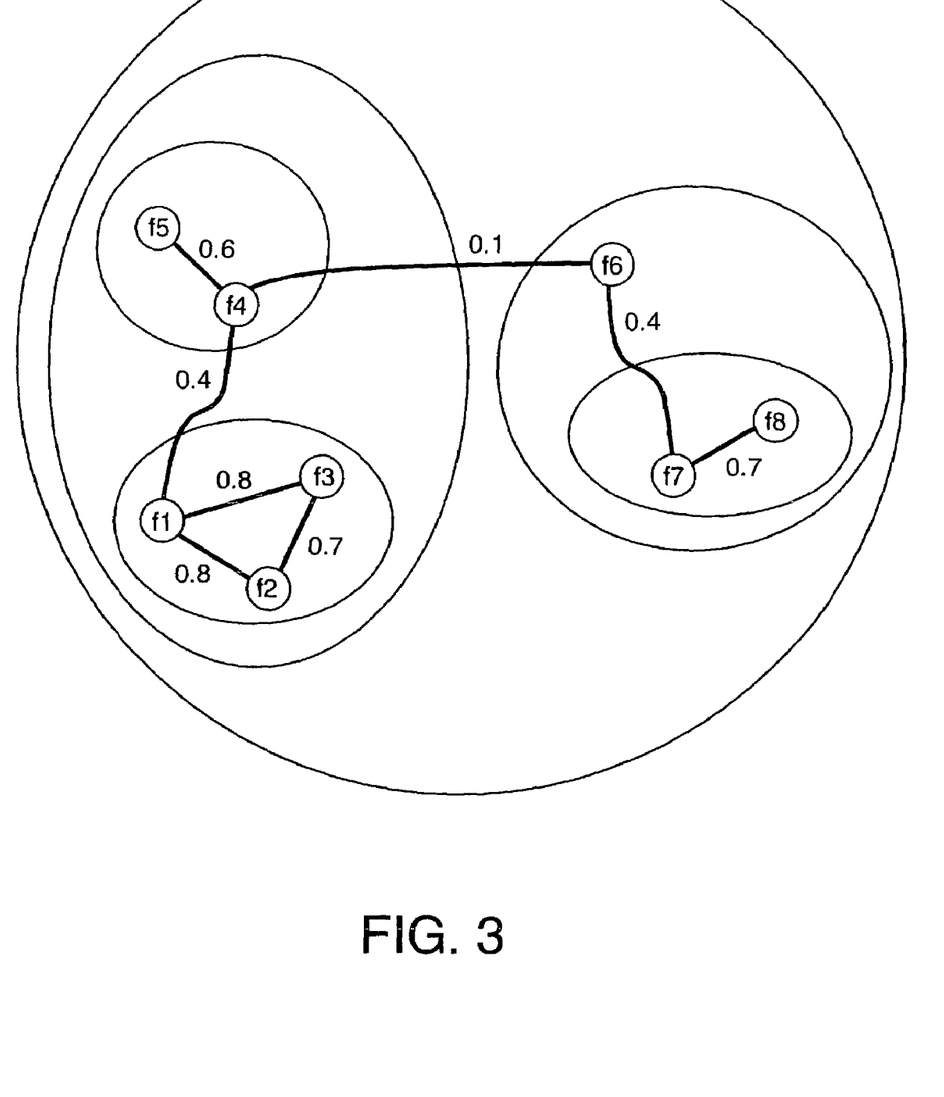
FIG. 3 illustrates several functions and the similarity between every two functions.

The component classification process is disclosed in detail with reference to FIG. 3. Illustrated as circles are eight functions f1 to f8.

The similarity between two functions is expressed with a line connected between the circles of the two functions and a numeral written along the line for every function combination. In FIG. 3, the similarity is a decimal with the tenths place.

The sequential selection of function combinations having the highest similarity (S142 to S145) is performed with elimination of similarities lower than a reference similarity level while lowering the reference level.

The reference similarity level is set at, for example, "0.8" that is the highest similarity in FIG. 3. The function group of the highest similarity (f1, f2, f3) is then added to the tree and the similarity 0.8 is registered as a node.

Next, the reference similarity level is lowered to 0.7. The function group of the second highest similarity (f7, f8) is added to the tree and the similarity 0.7 is registered as a node.

Figure 4:
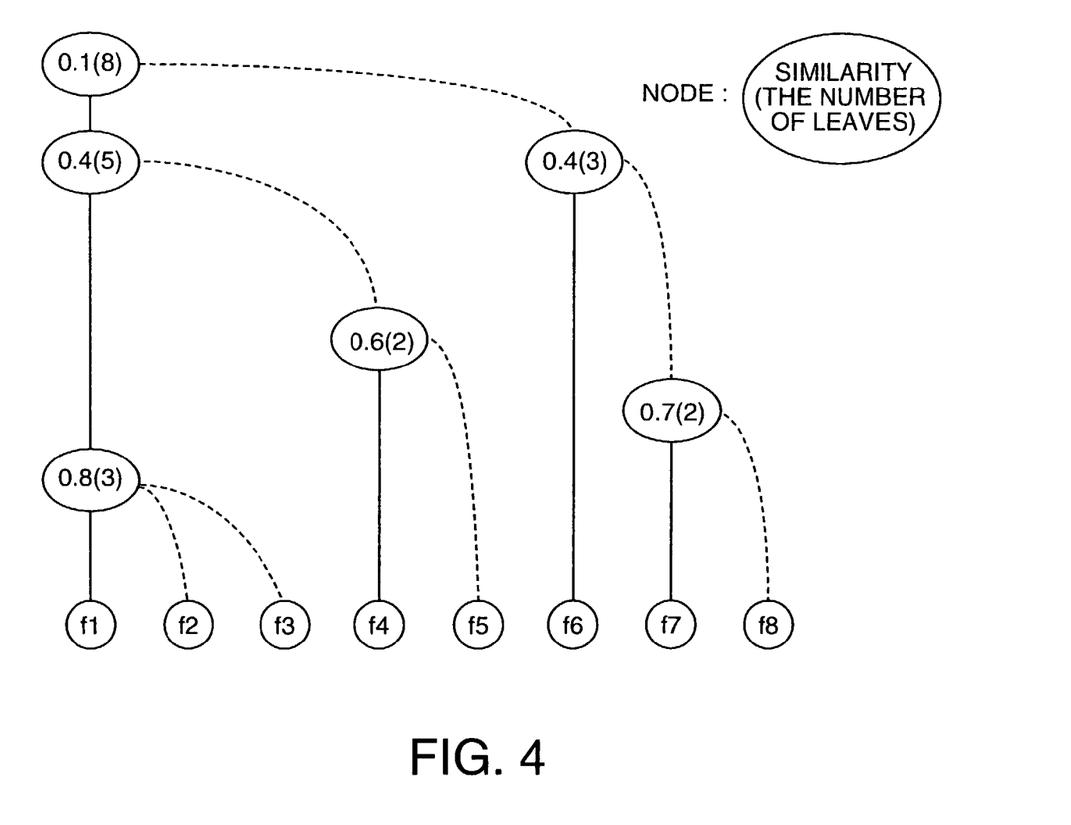
FIG. 4 illustrates a data structure having a tree-like hierarchy with "n" branches expressing the functions shown in FIG. 3, the similarity between every two functions and function groups in accordance with the similarity.

The same process is repeated towards the lowest similarity 0.1 to create a group structure with the hierarchical similarities indicated by circles and also a tree of the hierarchical structure, as shown in FIG. 4. FIG. 4 illustrates n-ary tree for the functions f1 to f8, the similarities between every two functions and the function groups formed in accordance with the similarities, shown in FIG. 3.

In this embodiment, as shown in FIG. 4, the tree is composed of contacts having the parent-children structure, like ordinary n-ary tree. Defined in the tree are a top node (a contact with no parents), leaves (contacts with no children) and nodes (except the leaves).

The leaves of the tree in FIG. 4 have one-to-one correspondence with all functions in a source program.

Each node has leaves or other nodes as children, with attribute information on the number of these leaves and similarities.

The attribute information is defined as follows:

(Definition 1): Leaves possessed by a node are those that are to become the children of the node or leaves of nodes that are also to become the children of the node. In other words, the number of leaves possessed by a node K is equal to the addition of the number of leaves that are to become the children of the node K and the number of leaves of nodes that are also to become the children of the node K.

(Definition 2): Similarities possessed by a node as attribute information is defined as follows:

Suppose that a node K has "n" number of children. A leaf is selected for each child if the children are leaves. Or, a leaf is selected among the leaves possessed by each node if the children are nodes. The set of "n" number of selected leaves is given as leaf $(K)=\{K_1, K_2, \ldots, K_n\}$.

When a similarity "s" is given, leaf(K) is defined as conleaf(K, s), if for any element k included in the leaf(K), $k_i$ ($1 \leq i \leq n$, $k \neq k_i$, $k_i \in$ leaf(K)) having the similarity "s" between $k_i$ and k exists.

When a node K possesses a similarity "s" as attribute information, the following requirements (i) and (ii) are always met at the same time:

(i) At least one conleaf(K, s) exists.

(ii) No conleaf(K, s1) exists for a similarity "s1" which is higher than the similarity "s".

The tree in this embodiment is created according to the following criterion:

(Criterion): A similarity s(C) of a child node is higher than a similarity s(P) of its parent node.

It can be said that the higher the similarity between functions, the higher the possibility that the functions have the same functionality. It can also be said that the more the functions have the same functionality, the higher the cost for modification may become.

The tree function classification disclosed above indicates the set of functions having similarities over a certain level and a number, and also the level of similarity, with the nodes and node-to-node relationship in the tree.

The set of functions having similarities over a certain level corresponds to the union of the sets of leaves possessed by nodes that have the similarities as the attribute information. The number indicated in the tree corresponds to the number of leaves possessed by a node, written in the attribute information of the node. The level of similarity is expressed as parent-to-child relationship among the nodes.

The component classification method in this embodiment offers an easily-understandable tree that reflects information on functional redundancy that is hardly extracted from a dendrogram in the known hierarchical cluster analysis, which is discussed below in detail.

The dendrogram used in the known hierarchical cluster analysis has few nodes or leaves, such as two, as children of a node due to its purpose and creating technique.

Software to which the present invention is applied, however, tends to have functionally-redundant code segments at the same similarity. Therefore, the groups of components similar to one another at the same similarity and the number of such groups should be focused in the component classification. A node having several nodes of the same similarity is preferably set as a parent.

The tree offered in this embodiment unites multiple components similar at the same similarity in one group, for effective handling of information on functional redundancy, which is hardly extracted from the dendrogram in the known hierarchical cluster analysis.

Similarity is often expressed as a real number with a very large or infinite number of figures. The figures are limited according to the performance of a computer.

In this embodiment, the figures of a real number for similarities can be limited to small figures for grouping the similarities according to similarity ranges.

For example, similarities expressed as decimals of the tenth place in FIG. 3 are hierarchically grouped at the maximum 9 stages from 0.1 to 0.9.

The number of hierarchy levels in the tree is adjustable according to the stages in the similarity grouping in this embodiment.

As disclosed above, the component classification method in this embodiment classifies program code segments (components) into an easily-understandable tree-like hierarchical structure that reflects functional redundancy, thus achieving quantitative evaluation of functional redundancy in a program.

Moreover, the number of hierarchy levels in the tree is adjustable according to the stages of similarity grouping to express the set of similar components in the component classification method in this embodiment. Especially, limitation of the number of stages in grouping provides a large set of similar components. Such a large component set can be easily handled for easier quantitative evaluation of functional redundancy.

2. Functional-Redundancy Estimation

Figure 5:
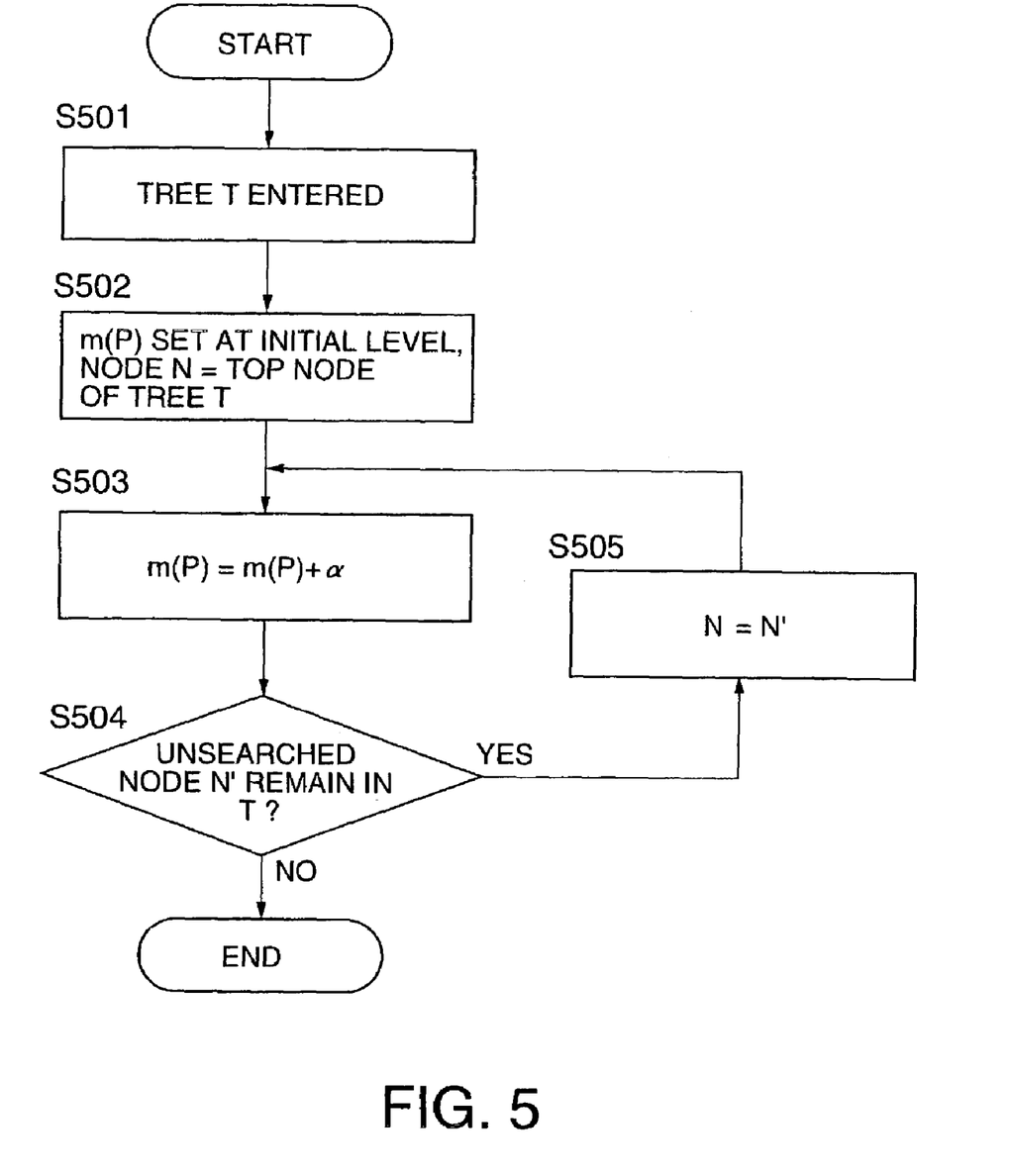
FIG. 5 shows a flowchart indicating an outline of a method of functional-redundancy estimation according to a second embodiment of the present invention.

FIG. 5 shows a flowchart indicating an outline of a method of functional-redundancy estimation according to a second embodiment of the present invention.

This functional-redundancy estimation method is to estimate functional redundancy in a program based on the tree created by the component classification disclosed above or a dendrogram created by the known hierarchical cluster analysis.

Functional redundancy is defined as having the following features under the functional-redundancy estimation method.

(Feature 1): The higher the similarity between functions, the higher the functional redundancy. This is because it is estimated that these functions have the same or similar functionality.

(Feature 2): The more (it is estimated) the functions having the same functionality, the higher the functional redundancy.

In accordance with these features, the functional-redundancy estimation method in this embodiment estimates functional redundancy based on similarity possessed by each node in the tree as an attribute and also the number of children (or leaves) possessed by each node.

Disclosed below is the functional-redundancy estimation using the tree created by the component classification method described above, for brevity. Not only for such a tree, this estimation method can be applied to a dendrogram with the height of each node instead of the similarity of the node to others.

As shown in FIG. 5, a tree T is entered in a computer and stored in a storage medium such as a memory (S501).

The initial level of a functional redundancy m(P) for a program P expressed by the tree T is set at a certain number and the top node of the tree T is selected as a node N (S502).

A specific computation is applied to attribute information including the similarity and the number of children of the top node selected as node N, a computation-resultant level a being added to the functional redundancy m(P) (S503).

The specific computation is performed for every node in the tree T (YES in S504, S505) to obtain a functional redundancy m(P) including the total of the level a for all nodes.

Two types of the specific computation per node and the initial level will be disclosed in detail.

[Computation 1]

A level $\alpha$ is obtained per node N with the following formula when the similarity can be expressed as a real number.

Initial level=1

$\alpha$=(the number of children of $N$−1)×(similarity in $N$)  [Formula 1]

The formula for obtaining a functional redundancy m(P) for the program P is defined as follows:

[Formula 2]

$$m(P) = \left\{ \sum_{N \in nodes(P)} (\text{the number of children of } N - 1) \times (\text{similarity in } N) \right\} + 1 \quad (1)$$

The nodes(P) in the formula (1) is the set of all of the nodes in the tree T obtained from the program P.

The total of the number of the term "the number of children of N−1"+1 in the right side of the formula (1) is equal to the number of functions possessed by the program P when the functional redundancy m(P) is obtained.

Therefore, the following formula is established when the similarity ranges from 0 to 1.

$m(P) \leq$ the number of functions possessed by the program $P$  [Formula 3]

This allows normalization with the following formula for comparison of indices between the program P and other programs.

$m(P)$/the number of functions possessed by the program $P$  [Formula 4]

The functional redundancy m(P) for the tree shown in FIG. 4 is obtained as follows with the formula (1).

$m(P)$=0.1×1+0.4×1+0.4×1+0.6×1+0.7×1+0.8×2+ 1=4.8  [Formula 5]

[Computation 2]

Initial level and a level $\alpha$ is also obtained per node N with the following formula when the similarity can be expressed as a real number.

Initial level=0  [Formula 6]

$\alpha$=(the number of children of $N$)$^2$×(similarity in $N$)

The formula for obtaining a functional redundancy m(P) for the program P is defined as follows:

[Formula 7]

$$m(P) = \sum_{N \in nodes(P)} (\text{the number of children of } N)^2 \times (\text{similarity in } N) \quad (2)$$

The functional redundancy m(P) obtained by the formula (2) especially reflects comparison indices for nodes having many children in the tree T. Also reflected in the functional redundancy m(P) is information on functions having the same functionality, the more such functions, the more reflected. This is because the number of children of one node indicates the number of functions having the same functionality.

The above method using a tree obtained by the component classification method already disclosed is more effective and advantageous than using a dendrogram obtained by the known hierarchical cluster analysis, in functional-redundancy estimation.

A functional redundancy m(P) for the tree shown in FIG. 4 is obtained by the formula (2) as follows:

$$m(P)=0.1\times2^2+0.4\times2^2+0.4\times2^2+0.6\times2^2+0.7\times2^2+0.8\times3^2=16$$

As disclosed above, the functional-redundancy estimation method in this embodiment mechanically performs computation on each node in a tree-like hierarchical structure involving information on comparison indices. The total computation results for all nodes offer easy quantitative functional-redundancy estimation in the entire program. In the above embodiment, while the functional-redundancy is calculated with using the number of the children of each node, the functional-redundancy can also be calculated with using the number of leaves of each node.

3. Functionally-Redundant Code-Segment Extraction

Figure 6:
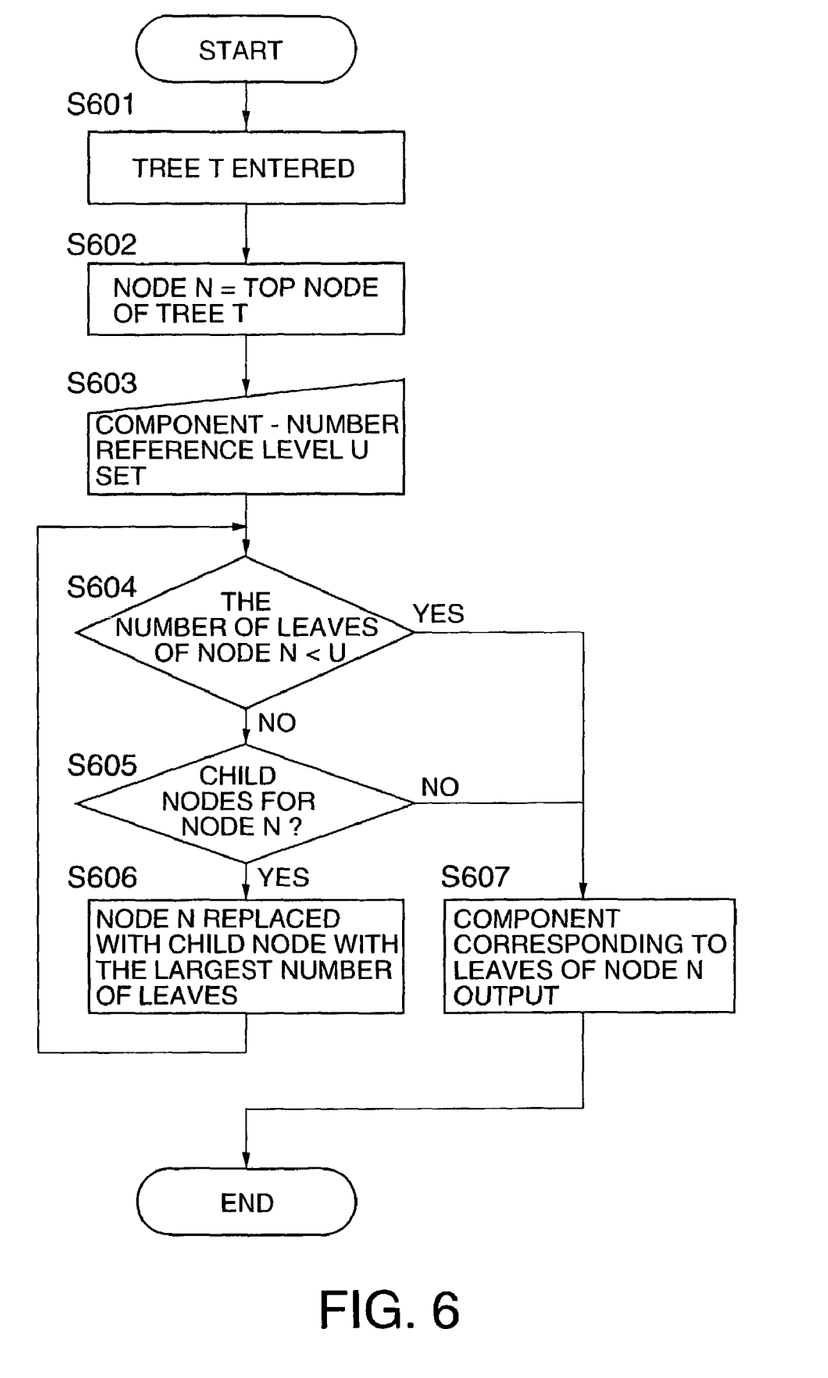
FIG. 6 shows a flowchart indicating an outline of a method of redundant-code-segments extraction according to a third embodiment of the present invention.

FIG. 6 is a flowchart indicating an outline of a method of extracting redundant code segments from a program according to a third embodiment of the present invention.

The redundant-code-segments extraction method in this embodiment is to extract redundant code segments from a program by using the tree created by the component classification method disclosed above or a dendrogram created by the known hierarchical cluster analysis method.

The main criterion in this extraction method is to extract a function having the highest similarity from among functions estimated as having high similarities and similar functionalities.

A tree T is entered in a computer and stored in a storage medium such as a memory (S601). The top node of the tree T is selected as a node (S602) and then a reference level is set for the number of sets of functions (S603).

The process goes down the tree T along nodes from the top node to leaves. The number of leaves possessed by the nodes is becoming smaller as the process is proceeding. This is because the number of leaves possessed by parent nodes is larger than that possessed by child nodes in the tree structure.

According to the criterion mentioned above, the process goes down the tree T from a parent node to child nodes while selecting child nodes each having the largest number of leaves at each hierarchy.

In detail, as shown in FIG. 6, when the number of leaves possessed by a newly selected node N is higher than a reference level U (NO in S604), and then when there are child nodes for the node N (YES in S605), one of the child nodes that has the largest number of leaves is selected as the next new node N (S606).

When the number of the newly selected nodes N is lower than the reference level U (YES in S604) or there is no child node for the lastly selected node N (NO in S605), the set of components, or the set of functions, corresponding to the leaves of the lastly selected node N is informed to a user (S607).

The method disclosed above always selects a child having the largest number of leaves at each hierarchy, thus can select the set of redundant code segments having many components.

In the tree shown in FIG. 4, the top node [0.1 (8)] is selected first and the process goes down the tree along a node [0.4 (5)] and then a node [0.8 (3)] having more leaves than other nodes.

When the reference level U is lower than 5, functions corresponding to leaves f1 to f3 of the node [0.8 (3)] are selected as redundant code segments. On the contrary, when the reference level U is equal to or higher than 5, functions corresponding to leaves f1 to f5 of the node [0.4 (5)] are selected as redundant code segments.

It is preferable to display the tree structure on a monitor screen when informing a user of the functions selected as above. Such a display allows the user to easily decide the priority order from the functions in the tree structure for enhanced classification of common capabilities in advance.

The redundant-code-segment extraction method in this embodiment repeats a mechanical operation to select each child node having the largest number of leaves starting from the top node in the tree, to effectively and accurately extract redundant code segments in a program.

Therefore, this method allows a user to easily determine which functionality should be classified as a common function for effective code modifications which would be performed later when several redundant code segments have been distributed over a program.

4. Extraction of Components to be Simultaneously Modified

Figure 7:
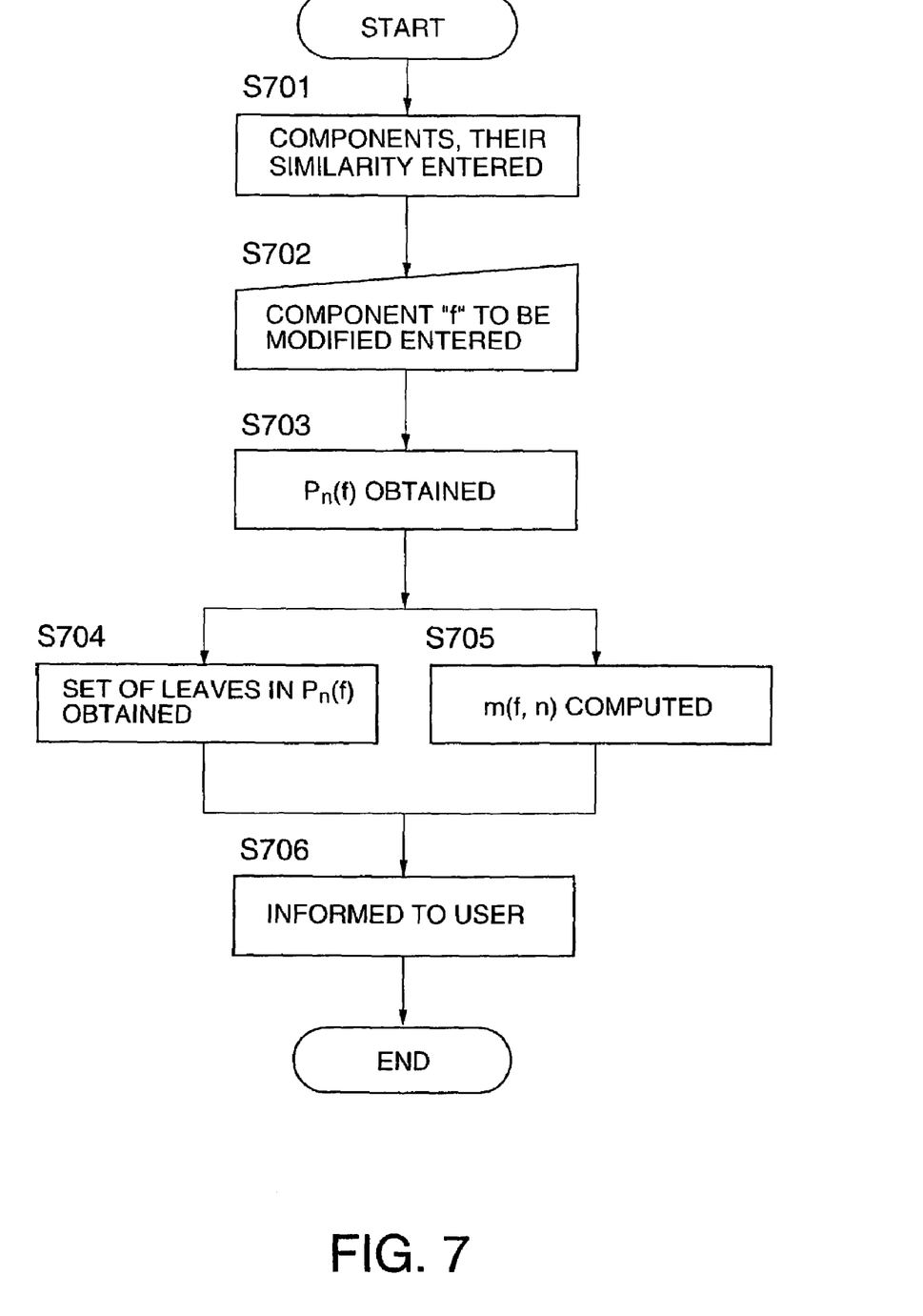
FIG. 7 shows a flowchart indicating an outline of a method of components-to-be-simultaneously-modified extraction according to a fourth embodiment of the present invention.

FIG. 7 is a flowchart indicating an outline of a method of extracting components to be simultaneously modified according to a fourth embodiment of the present invention.

The extraction method in this embodiment is to extract several components to be modified at the same time in program modifications using the tree created by the component classification method disclosed above or a dendrogram created by the known hierarchical cluster analysis.

As shown in FIG. 7, a tree T including function information on functions and similarity between every two functions is entered in a computer and stored in a storage medium such as a memory (S701).

When a user select a function "f" to be modified (S702), a node pn(f) is obtained which is the n-th ancestor of the leaves corresponding to the function "f" (S703). Obtained next is functional redundancy m (f, n) of the function "f" from information carried by the node pn(f) (S704).

The functional redundancy m (f, n) of the function "f" is defined as functional redundancy corresponding to a subtree having the node pn(f) as the top node. A specific computation is performed using the number of children of each of nodes in the tree and the similarity between the nodes, thus quantitative evaluation of the functional redundancy m (f, n) being made based on the total of computation results.

Simultaneously with the evaluation of the functional redundancy m (f, n), the set of leaves possessed by the node pn(f), the n-th ancestor of the leaves corresponding to the function "f", is obtained as a candidate of functions to be modified at the same time (S705). The number or range of the candidates can be adjusted by varying the natural number "n" based on evaluation of the number of leaves of the node pn(f) and/or the functional redundancy m (f, n).

The information on the functional redundancy and the candidates for simultaneous modification are displayed on a monitor screen (S706). Based on the information, a user can determine whether to modify other functions in addition to the functions to be modified and to which functions modifications should be made.

It is preferable to display the tree structure on a monitor screen when informing a user of the information obtained as above. Such a display allows the user to make easy determination as to whether there are additional functions to be modified and/or which function should be modified, for enhanced function modifications.

Obtained through the flowchart shown in FIG. 7 are the functional redundancy m (f, n) corresponding to the branches of the tree having the node pn(f) that is the top node and the n-th ancestor of the leaves corresponding to the function "f" and also the set of leaves possessed by the node pn(f) for the candidates of functions to be simultaneously modified.

Instead, the information carried by a node p(f) that is a parent of the leaves corresponding to the function "f" may only be obtained. The functional redundancy m (f) of the function "f" is defined, for example, as follows:

$$m(f)=(\text{the number of children of } p(f)) \times (\text{similarity in } p(f))$$ [Formula 9]

The functional redundancy m (f) and the set of leaves possessed by the node p(f) obtained as above are informed to a user on a monitor screen.

The method of extracting components to be simultaneously modified in this embodiment employs a tree involving function information on functions and similarity between every two functions, for easy evaluation of functional redundancy to user-selected functions and effective and accurate extraction of redundant functions to the selected functions.

Therefore, the extraction method in this embodiment offers a user who is trying to modify a function an evaluation result of similarity in this function and also the set of other candidate functions to be modified, for enhanced function modifications to programs.

Disclosed above is the extraction method with a tree entered in advance. Not only that, a subtree including leaves corresponding to functions may be created when this function is selected by a user, for extraction of necessary information.

[5. Class-Hierarchy Reconstruction]

Figure 8:
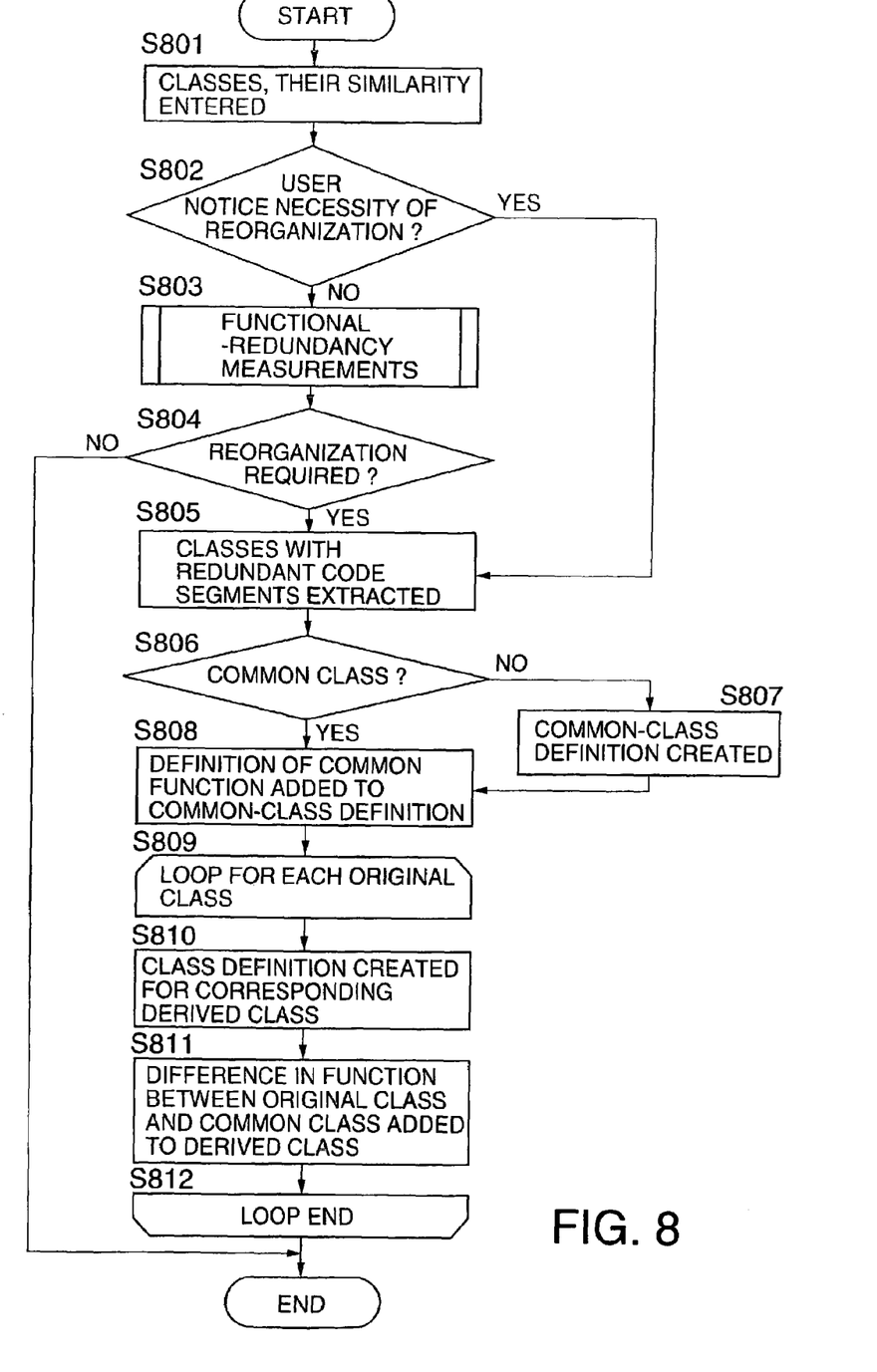
FIG. 8 shows a flowchart indicating an outline of a method of class-hierarchy reorganization according to a fifth embodiment of the present invention.

FIG. 8 is a flowchart indicating an outline of a method of reorganizing class hierarchy according to a fifth embodiment of the present invention.

The reorganization method in this embodiment applies the functional-redundancy estimation method, the redundant-code-segment extraction method or the components-to-be-simultaneously-modified extraction method disclosed above to reorganization of class hierarchy in software developed with an object-oriented language. The target components are class definitions in an object-oriented program.

As shown in FIG. 8, class information on class definitions defined in a program and similarity between every two class definitions are entered in a computer and stored in a storage medium such as a memory (S801).

It is determined whether a user has indicated his or her will to reorganize class hierarchy or not (S802). If no indication from the user because he or she does not understand the necessity of reorganization (NO in S802), functional redundancy is measured based on the class definitions and similarities between every two definitions under the functional-redundancy estimation method (FIG. 5), etc., and informed to the user (S803).

According to the method in this embodiment, the user can easily determine whether class hierarchy should be reconstructed based on the informed functional redundancy.

When the user has indicated his or her will to reconstruct class hierarchy (YES in S804), class definitions possessing redundant code segments are extracted (S805) as candidates for class-definition reorganization by the redundant-code-segment extraction method (FIG. 6) or the components-to-be-simultaneously-modified extraction method (FIG. 7).

It is determined whether there are any common classes among the extracted classes (S806).

If no common class (NO in S806), a new common-class definition is created (S807). The definition of function (also called method) shared by the extracted classes is added to the class definition as the function of an already or a newly created common class (S808).

For every extracted original class (S809), a class definition is created as a derived class from the common class (S810). The difference between each original class and the common class is added to the class definition as the function of the derived class (S811). The loop processing then ends (S812) to complete class-hierarchy reorganization.

Figure 9:
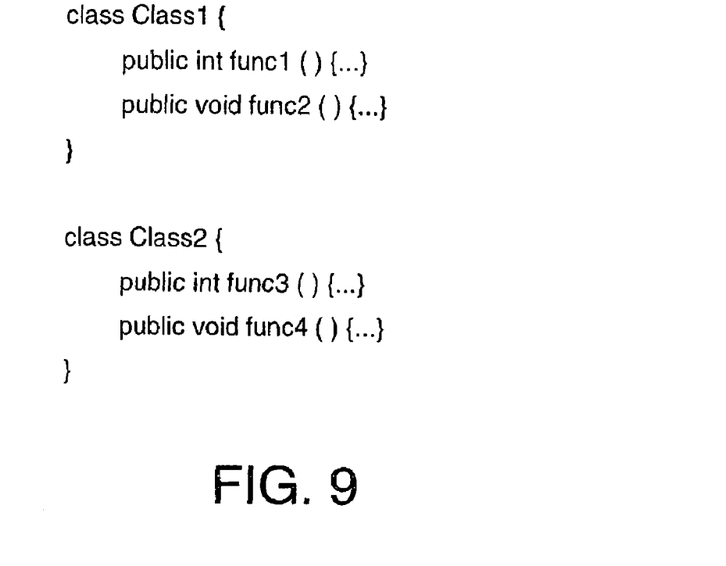
FIG. 9 illustrates Java program code segments before application of the class-hierarchy reorganization shown in FIG. 8.
Figure 10:
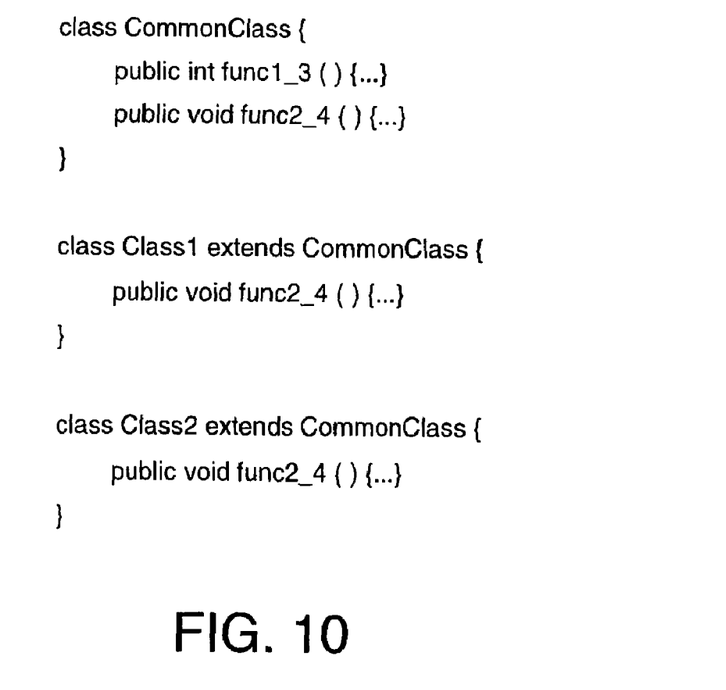
FIG. 10 illustrates the program code segments (FIG. 9) after applied the class-hierarchy reorganization shown in FIG. 8.

Illustrated in FIGS. 9 and 10 are class-hierarchy reorganization to Java code segments. FIGS. 9 and 10 show code segments before and after class-hierarchy reorganization, respectively. Only the minimum number of code segments is shown for brevity in explanation.

Suppose that, among the code segments in FIG. 9, code segments fund in Class1 and func3 in Class3 have the same function, and also code segments func2 in Class1 and func4 in Class2 have similar functions. In other words, suppose that the code segments fund and func3 have the identical function whereas func2 and func4 share a part of function although not identical.

If there is no common class for the classes Class1 and Class2 extracted as classes having redundant code segments, a common class CommonClass is defined. The function common to the classes Class1 and Class2 is then added to the common class definition CommonClass. Added in this example are func1_3 (common function to fund and func3) and func2_4 (common function to func2 and func4).

The statement "extends CommonClass" is added to each of the original classes Class1 and Class2 to create a new class definition. This statement means that Class1 and Class2 are derived classes from the common class.

The difference in function between the original classes and the common class are then added to the derived classes Class1 and Class2. In detail, a difference between func2 and func2_4 is added to the derived class Class1, and a difference between func4 and func2_4 is added to the derived class Class2. On the contrary, fund and func3 are identical to each other, hence there is no difference between these code segments and the function func1_3, thus no addition to the class definition.

As disclosed above, the class-hierarchy reorganization method in this embodiment applies several techniques, such as, the functional-redundancy evaluation method (FIG. 5) or the redundant-code-segment extraction method (FIG. 6) and the components-to-be-simultaneously-modified extraction method (FIG. 7) to a source program written in an object-oriented language, for effective and accurate extraction of class definitions having redundant code segments.

Therefore, the reorganization method in this embodiment can provide a user with class definitions having redundant code segments as information on candidates for class-definition reorganization when the user enters a class-hierarchy reorganization command, thus strongly supporting the class-hierarchy reorganization operation.

Moreover, the reorganization method in this embodiment can evaluate and inform the user of functional redundancy based on information on classes under the functional-redundancy estimation method (FIG. 5), etc., even when a user does not recognize the necessity of class-hierarchy reorganization. Thus, the user can easily determine whether to reorganize the class hierarchy.

Therefore, the reorganization method in this embodiment achieves accurate class-hierarchy reorganization while informing the user of functional redundancy to make him or her recognize the necessity of class-hierarchy reorganization when he or she does recognize the necessity.

The user can perform the class-hierarchy reorganization operation by himself or herself. Nevertheless, this operation can be mechanically or automatically executed on a computer with creation of class definitions for common classes and derived classes and also addition of functions to the classes. Such a computer-automated operation achieves effective and accurate class-hierarchy reorganization and reduction of user operations.

6. Other Embodiments

The present invention is not limited to the several embodiments disclosed above but includes other embodiments. For example, the tree created by the component-classification method is used in the methods of functional-redundancy estimation, redundant-code-segment extraction and components-to-be-simultaneously-modified extraction in the foregoing disclosure.

The methods are, however, also feasible with a dendrogram created by the known cluster analysis method, with data to be used as comparison indices between components.

As disclosed above in detail, the several embodiments according to the present invention employ a tree-like hierarchal structure reflecting source-program components and comparison indices between components.

Therefore, embodiments of the present invention using the comparison indices different from the reference level employed in the known techniques provide the functional-redundancy estimation method for quantitatively and easily evaluating functional redundancy in a source program, the redundant-code-segment extraction method for effectively and accurately extracting redundant code segments in the source program and also the components-to-be-simultaneously-modified extraction method for effectively and accurately extracting code segments required for simultaneous modification in the source program based on quantitative functional-redundancy evaluation.

Moreover, embodiments of the present invention provide the component-classification method for classifying source-program components in an easily-understandable tree-like hierarchical structure reflecting functional redundancy to quantitatively evaluate functional redundancy in a source program.

Furthermore, embodiments of the present invention provide the class-hierarchy reorganization method for reorganizing class hierarchy with effective and accurate extraction of class definitions having redundant code segments from a source program written in an object-oriented language.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

The invention claimed is:

1. A source-program processing method for processing a source program on a computer comprising:

dividing code of the source program into components and extracting a group of components by the computer;

comparing every two components among the extracted group of components by the computer, thus obtaining a comparison index for the two components;

classifying the extracted group of components in a tree-like hierarchical structure by the computer, based on the extracted group of components and the comparison index for every two components, the hierarchical structure having nodes each possessing three types of information which are the comparison index for every two components, the number of children of each node and the number of leaves of each node;

retrieving two types of information, which are the comparison indices and at least one of the number of children of each node and the number of leaves of each node, on each node in the tree-like hierarchical structure and carrying out a specific computation based on the information by the computer; and quantitatively evaluating functional redundancy of the source program based on the specific computation for the nodes in the tree-like hierarchical structure by the computer, the functional redundancy indicating how many code segments having similar functions are incorporated in the source program.

2. The source-program processing method according to claim 1, wherein the specific computation subtracts 1 from the number of children and multiplies the subtraction result by the comparison index.

3. The source-program processing method according to claim 1, wherein the specific computation multiplies a power of the number of children by the comparison index.

4. The source-program processing method according to claim 1, further comprising:

making a user select a component to be modified in the source program by the computer; and extracting functionally-redundant components as candidates for component-to-be-simultaneously-modified to the user-selected component based on the component group information including the group of the components and the comparison index for every two components of the group of components by the computer.

5. The source-program processing method according to claim 1, wherein the comparing every two components and obtaining the comparison indices includes hierarchically grouping comparison indices each for every two components among the extracted group of components, and the classifying the extracted group of components includes classifying hierarchy according to the grouped comparison indices in the tree-like hierarchical structure.

6. The source-program processing method according to claim 1, further comprising:

going down the tree-like hierarchical structure representative of the group of components of the source-program along the nodes from a top node to leaves of the structure by the computer while selecting a node as a child having the maximum number of leaves in each stage of hierarchy by referring to a predetermined reference level for the number of sets of components; and outputting a set of components corresponding to leaves of a newly selected node by the computer when the number of leaves of the newly selected node is lower than the reference level or there is no node to be selected as the child.

7. A class-hierarchy reorganization method for reorganizing class hierarchy in a source program written in an object-oriented language on a computer, comprising extracting a group of class definitions having functionally-redundant code segments as a candidate for reorganization from the source program based on class group information on class definitions and comparison indices for class definitions in the source program, when a user indicates necessity for reorganizing class hierarchy, the extracting the group of class definitions including:

comparing every two classes from the group of class definitions by the computer, thus obtaining a comparison index for the two classes;

classifying the group of class definitions in a tree-like hierarchical structure by the computer, based on the group of class definitions and the comparison index for every two classes, the hierarchical structure having nodes each possessing three types of information which are the comparison index for every two classes, the number of children of each node and the number of leaves of each node;

going down the tree-like hierarchical structure along the nodes from a top node to leaves of the structure by the computer while selecting a node as a child having the maximum number of leaves in each stage of hierarchy by referring to a predetermined reference level;

outputting the group of class definitions corresponding to leaves of a newly selected node as a candidate for class-definition reorganization by the computer when the number of leaves of the newly selected node is lower than the reference level or there is no node to be selected as the child; and evaluating functional redundancy of the code based on the class group information and informing the user of a result of the evaluation by the computer, the functional redundancy indicating how many code segments having similar functions are incorporated in the source program, thus supporting the user in determination of whether to reorganize the class hierarchy, the evaluating functional redundancy including:

retrieving two types of information, which are the comparison indices and at least one of the number of children of each node and the number of leaves of each node, on each node in the tree-like hierarchical structure and carrying out a specific computation based on the information; and quantitatively evaluating the functional redundancy of the code based on the specific computation for the nodes in the tree-like hierarchical structure.

8. The class-hierarchy reorganization method according to claim 7, wherein the specific computation subtracts 1 from the number of children and multiplies the subtraction result by the comparison index.

9. The class-hierarchy reorganization method according to claim 7, wherein the specific computation multiplies a power of the number of children by the comparison index.

* * * * *